(12) United States Patent
Valle (10) Patent No.: US 9,902,205 B2
(45) Date of Patent: Feb. 27, 2018

(54) VEHICLE TIRE COMPRISING A LAYER OF CIRCUMFERENTIAL REINFORCING ELEMENTS

(71) Applicant: Michelin Recherche et Technique S.A., Granges-Paccot (CH)

(72) Inventor: Alain Valle, Cebazat (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 625 days.

(21) Appl. No.: 14/444,444

(22) Filed: Jul. 28, 2014

(65) Prior Publication Data
US 2015/0027612 A1 Jan. 29, 2015

Related U.S. Application Data

(62) Division of application No. 13/140,697, filed as application No. PCT/EP2009/066988 on Dec. 1, 2009, now abandoned.

(30) Foreign Application Priority Data

Dec. 17, 2008 (FR) ...................................... 08 58730

(51) Int. Cl.
*B60C 9/22* (2006.01)
*B60C 9/20* (2006.01)
(Continued)

(52) U.S. Cl.
CPC .................. *B60C 9/04* (2013.01); *B60C 9/08* (2013.01); *B60C 9/22* (2013.01); *B60C 9/2204* (2013.01);
(Continued)

(58) Field of Classification Search
CPC . B60C 9/22; B60C 9/2204; B60C 2009/2271; B60C 2009/2087; Y10T 152/10783
(Continued)

(56) References Cited

U.S. PATENT DOCUMENTS 5,795,417 A * 8/1998 Damke ..................... B60C 9/22
152/531 X
6,244,315 B1 6/2001 Armellin
(Continued)

FOREIGN PATENT DOCUMENTS

EP    0 565 339        10/1993
EP    2 610 075 A1 *  7/2013
(Continued)

OTHER PUBLICATIONS

Mechanics of Pneumatic Tires, ed. Samuel Clark, US Dept. of Transportation, Aug. 1981, pp. 219-220.*
(Continued)

*Primary Examiner* — Adrienne C Johnstone
(74) *Attorney, Agent, or Firm* — Cozen O'Connor (57) ABSTRACT

A tire with radial carcass reinforcement comprises a crown reinforcement including a layer of circumferential reinforcing elements distributed axially at a variable pitch. The layer of circumferential reinforcing elements is radially crowned by a tread strip, which is connected to two beads by two sidewalls. The layer of circumferential reinforcing elements comprises five parts, including a central part, two intermediate parts and two axially outer parts. The value of the pitch in the two intermediate parts is less than a value of the pitch in the two axially outer parts. Each axially outer part is axially separated from the central part by a corresponding intermediate part. The value of the pitch in each intermediate part is less than a value of the pitch in the central part, and the value of the pitch in each axially outer part is less than the value of the pitch in the central part.

7 Claims, 3 Drawing Sheets

(51) Int. Cl.
*B60C 9/18* (2006.01)
*B60C 9/04* (2006.01)
*B60C 9/08* (2006.01)

(52) U.S. Cl.
CPC .............. *B60C 2009/1892* (2013.01); *B60C 2009/2087* (2013.01); *B60C 2009/2271* (2013.01); *B60C 2200/10* (2013.01); *Y10T 152/10783* (2015.01); *Y10T 152/10855* (2015.01)

(58) Field of Classification Search
USPC ................................................ 152/531, 533
See application file for complete search history.

(56) References Cited

U.S. PATENT DOCUMENTS

| | | | |
|---|---|---|---|
| 6,415,841 | B1 | 7/2002 | Armellin |
| 8,925,606 | B2 * | 1/2015 | Bordoz ................ B60C 9/2204 152/531 X |
| 9,156,316 | B2 * | 10/2015 | Bordoz ................ B60C 9/2204 |
| 2002/0026979 | A1 * | 3/2002 | Tanaka ................ B60C 9/2204 |
| 2003/0155056 | A1 | 8/2003 | Armellin |
| 2006/0196590 | A1 | 9/2006 | Maurel |
| 2008/0087365 | A1 * | 4/2008 | Potin ................... B60C 9/2204 |
| 2009/0183814 | A1 * | 7/2009 | Ueda ....................... B60C 9/22 |
| 2011/0303339 | A1 * | 12/2011 | Valle ................... B60C 9/2204 |

FOREIGN PATENT DOCUMENTS

| | | | |
|---|---|---|---|
| JP | 2007084025 A | * | 4/2007 |
| JP | 2009255753 A | * | 11/2009 |
| WO | WO 98/02320 | | 1/1998 |
| WO | WO 2005/025895 | | 3/2005 |
| WO | WO-2006/032479 A1 | * | 3/2006 |
| WO | WO-2010/069887 A1 | * | 6/2010 |

OTHER PUBLICATIONS

English machine translation of JP 2007-84025 A, Apr. 5, 2007.*
Rubber Technology and Manufacture, ed. C. M. Blow, Butterworth & Co. Ltd., 1975, p. 351.*

* cited by examiner

VEHICLE TIRE COMPRISING A LAYER OF CIRCUMFERENTIAL REINFORCING ELEMENTS

CROSS-REFERENCE OF RELATED APPLICATIONS

This is a divisional application of U.S. patent application Ser. No. 13/140,697, filed on Sep. 2, 2011 and incorporated herein in its entirety by reference, which is a U.S. National Stage under 35 U.S.C. § 371 of PCT Application No. PCT/EP2009/066988, filed on Dec. 1, 2009, which in turn claims the priority of French Application No. 08/58730, filed on Dec. 17, 2008.

FIELD OF THE INVENTION

The invention relates to a tire intended to be fitted to a vehicle and, more particularly, intended to be fitted to a two-wheel vehicle such as a motorcycle. Although not restricted to such an application, the invention will be described more particularly with reference to such a motorcycle, or motorbike, tire.

BACKGROUND OF THE INVENTION

The reinforcement that reinforcing tires and, notably, motorcycle tires, is currently—and usually—made up of a stack of one or more plies conventionally known as "carcass plies", "crown plies", etc. This way of naming the reinforcements stems from the method of manufacture which involves producing a series of semi-finished products in the form of plies, provided with elementary reinforcements, which are often longitudinal, which are subsequently assembled or stacked to build up a green tire. The plies are produced flat, with large dimensions, and are subsequently cut to suit the dimensions of a given product. The plies are also initially assembled in a substantially flat shape. The green tire thus built is then shaped to adopt the toroidal profile typical of tires. The so-called "finishing" semi-finished products are then applied to the green tire to obtain a product ready to be vulcanised.

Such a "conventional" type of method involves, particularly for the phase of building the green tire, the use of an anchoring element (generally a bead wire) which is used to anchor or hold the carcass reinforcement in the region of the heads of the tire. Thus, for this type of method, a portion of all the plies that make up the carcass reinforcement (or just part thereof) is wrapped around a bead wire positioned in the bead of the tire. This then anchors the carcass reinforcement in the bead.

The widespread use throughout industry of this conventional type of method, despite the numerous alternative variations used regarding the creation of the plies and assemblies, has led a person skilled in the art to employ terminology based on the method: hence the generally accepted terminology comprising notably the terms "plies", "carcass", "bead wire", "shaping" to denote the switch from a flat profile to a toroidal profile, etc.

Nowadays there are tires which do not strictly speaking have "plies" or "bead wires" as defined in the above definitions. For example, document EP 0 582 196 describes tires which are manufactured without the use of semi-finished products in the form of plies. For example, the reinforcing elements in the various reinforcing structures are applied directly to the adjacent layers of rubber compound, everything being applied in successive layers to a toroidal form the shape of which makes it possible to obtain directly a profile that can be likened to the final profile of the tire that is being built. Thus, in this case, there are no longer any "semi-finished products", or any "plies", or any "bead wires". The basic products, such as the rubber compounds and the reinforcing elements in the form of threads or filaments, are applied directly to the form. Because this form is of toroidal shape, the green tire no longer has to be shaped in order to change from a flat profile to a profile in the shape of a torus.

Furthermore, the tires described in that document do not have the "traditional" turning back of the carcass ply around a bead wire. That type of anchorage is replaced by an arrangement in which circumferential threads are positioned adjacent to the sidewall reinforcing structure, everything being embedded in a rubber anchoring or cushioning compound.

There are also methods of assembly on a toroidal form that use semi-finished products which are specially designed for rapid, effective and simple laying on a central form. Finally, it is also possible to use a hybrid comprising both certain semi-finished products for creating certain architectural aspects (such as plies, bead wires, etc.), while others are achieved by the direct application of compounds and/or reinforcing elements.

In this document, in order to take account of recent technological advances both in the field of manufacture and in that of the product design, the conventional terms such as "plies", "bead wires", etc., are advantageously replaced by neutral terms or terms that are independent of the type of method used. Thus, the term "carcass-type reinforcement" or "sidewall reinforcement" is valid for denoting the reinforcing elements in a carcass ply in the conventional method and the corresponding reinforcing, elements generally applied to the sidewalls of a tire produced using a method that does not employ semi-finished products. The term "anchoring region", for its part, can just as easily denote the "traditional" wrapping of the carcass ply around a bead wire in a conventional method as it can the assembly formed by the circumferential reinforcing, elements, the rubber compound and the adjacent sidewall reinforcement portions of a bottom region produced using a method involving applying products to a toroidal form.

The longitudinal direction of the tire, or circumferential direction, is the direction corresponding to the periphery of the tire and defined by the direction in which the tire runs. A circumferential plane or circumferential plane of section is a plane perpendicular to the axis of rotation of the tire. The equatorial plane is the circumferential plane that passes through the centre or crown of the tread strip.

The transverse or axial direction of the tire is parallel to the axis of rotation of the tire. The radial direction is a direction that intersects the axis of rotation of the tire and is perpendicular thereto. The axis of rotation of the tire is the axis about which it rotates in normal use. A radial or meridian plane contains the axis of rotation of the tire.

As with all other tires, tires for motorbikes are switching over to a radial design, the architecture of such tires comprising a carcass reinforcement formed of one or two layers of reinforcing elements that make an angle possibly comprised between 65° and 90° with the circumferential direction, the carcass reinforcement being radially surmounted by a crown reinforcement formed of reinforcing elements. There do, however, still remain some non-radial tires to which the invention also relates. The invention also relates to partially radial tires, that is to say tires in which the reinforcing elements of the carcass reinforcement are radial over at least part of the carcass reinforcement, for example in the part corresponding to the crown of the tire. In a variant of the FIG. 3 embodiment wherein at least one of the parts has a varying pitch, the pitch values are such that each pitch value in each of the two intermediate parts 311a and 311b is less than each pitch value in each of the two lateral parts 313a and 313b, each pitch value in each of the two intermediate parts 311a and 311b is less than each pitch value in the central part 312, each pitch value in each of the two lateral parts 313a and 313b is less than each pitch value in the central part 312, the ratio of each value of the pitch in the two lateral parts 313a and 313b to each value of the pitch in the central part 312 is between 0.5 and 0.95, and the ratio of each value of the pitch in the two intermediate parts 311a and 311b to each value of the pitch in the central part 312 is between 0.4 and 0.7.

Numerous crown reinforcement architectures have been proposed, depending on whether the tire is intended to be fitted at the front of the motorbike or at the rear. A first structure, for the crown reinforcement, consists in using only circumferential cords, and the structure is more particularly used for a rear tire. A second structure, taking its inspiration directly from the structures commonly employed in passenger vehicle tires, has been used to improve wear resistance and consists in using at least two working crown layers of reinforcing elements that are substantially mutually parallel within each layer but crossed from one layer to the next making acute angles with the circumferential direction, such tires being more particularly suited to the front of motorbikes. The two working crown layers can be associated with at least one layer of circumferential elements, which are generally obtained by the helical winding of a strip of at least one rubber-coated reinforcing element.

The choice of crown architecture for the tires has a direct impact on certain tire properties such as wear, endurance, grip or even driving comfort or, particularly in the case of motorcycles, stability. However, other tire parameters such as the nature of the rubber compounds used in the tread strip also have an impact on the properties of the tire. The choice and nature of the rubber compounds used in the tread strip are, for example, essential parameters regarding wear properties. The choice and nature of the rubber compounds used in the tread strip also have an impact on the grip of the tire.

SUMMARY OF THE INVENTION

It is an object of the invention to provide a tire that is able to improve the wear and grip properties of the tire, in the case of motorcycle tires.

This object is achieved according to one aspect of the invention directed to a tire with a radial carcass reinforcement comprising a crown reinforcement comprising at least one layer of circumferential reinforcing elements distributed axially at a variable pitch itself radially crowned by a tread strip, the tread strip being connected to two beads by two sidewalls, the layer of circumferential reinforcing elements being comprised at least five parts, namely a central part, two intermediate parts and two axially outer parts, the value of the pitch in an intermediate part being less than the value of the pitch in the axially outer part axially separated from the central part by the intermediate part, and the value of the pitch in an intermediate part being less than the value of the pitch in the central part.

A layer of circumferential reinforcing elements within the meaning of the invention consists of at least one reinforcing element oriented at an angle of less than 5° formed with the longitudinal direction.

The pitch is the distance, measured along the curved abscissa axis of the layer of circumferential reinforcing elements, between the centres of two consecutive (or adjacent) circumferential reinforcing elements. In the case of a layer of circumferential reinforcing elements produced with several independent reinforcing elements laid simultaneously or alternatively with several reinforcing elements forming a strip, the pitch between these several reinforcing elements being constant, the "variable" pitch according to the invention is measured along the curved abscissa axis of the layer of circumferential reinforcing elements between the centres of the sets of reinforcing elements laid simultaneously. In other words, in the latter instances, the reinforcing elements laid simultaneously or in the form of strips are likened to a single reinforcing element of which the centre (in the direction of the curved abscissa axis of the layer of circumferential reinforcing elements) will be determined in order to measure the "variable" pitch.

The variation in the pitch between the circumferential reinforcing elements is embodied by a variation in the number of circumferential reinforcing elements per unit length in the transverse direction and, therefore, by a variation in the density of circumferential reinforcing elements in the transverse direction and therefore by a variation in the circumferential stiffness in the transverse direction.

The tire thus defined according to an embodiment of the invention has a layer of circumferential reinforcing elements which are distributed at a variable pitch leading to a layer that has a stiffness in the circumferential direction, or circumferential stiffness, which varies in the axial direction. According to an embodiment of the invention, the layer of circumferential reinforcing elements has a stiffness in the circumferential direction which increases from one axial end to an intermediate region before decreasing again from this intermediate region as far as the central part of the layer.

According to a first alternative form of embodiment of the invention, the value of the pitch in an axially outer part is greater than the value of the pitch in the central part. The stiffness in the circumferential direction of the axially outer part of the layer of circumferential reinforcing elements is therefore less than the stiffness in the circumferential direction of the central part. This alternative form of embodiment of the invention will notably be preferred for tires intended to be fitted to the rear of a motorcycle, because of the profile of these tires. What is meant by the profile of a tire is the curvature, or the sum of the curvatures, of the surface of the tread strip in a meridian view.

According to a second alternative form of embodiment of the invention, the value of the pitch in an axially outer part is less than the value of the pitch in the central part. The stiffness in the circumferential direction of the axially outer part of the layer of circumferential reinforcing elements is therefore greater than the stiffness in the circumferential direction of the central part. This alternative form of embodiment of the invention will notably be preferred for tires intended to be fitted to the front of a motorcycle, because of the profile of these tires.

A tire thus produced according to one or other of these alternative forms of the invention makes it possible to improve performance notably in terms of wear and grip because of the choices made regarding the variation in pitch between the reinforcing elements of the layer of circumferential reinforcing elements, the density of which is at a maximum in the intermediate regions. The distribution of stiffness in the layer of circumferential reinforcing elements notably encourages the flattening out of the tire at steep camber angles.

Moreover, the inventors have been able to demonstrate that the local reduction in the density of reinforcing elements in the layer of circumferential reinforcing elements nonetheless makes it possible to maintain the desired tire profile even though notably the crown region of the tire has a circumferential reinforcing element density that is lower than that usually required when the elements are distributed at constant pitch. The stiffness of the central part of the layer of circumferential reinforcing elements remains sufficient to ensure sufficient hooping of the tire in this central part to withstand the stresses applied notably when inflating or when driving at high speed and to limit the circumferential expansion of the crown reinforcement.

Other advantages of a tire according to the invention as compared with a tire comprising a layer of circumferential reinforcing elements distributed at a pitch that is constant across the entire axial width of the layer are, firstly, its weight and, secondly, its cost of manufacture. Because the structure of the tire according to the invention is lightened as compared with that of a conventional tire comprising a layer of circumferential reinforcing elements distributed at a constant pitch, the weight of the tire according to the invention is lower than that of the usual tire. Specifically, the pitch between the reinforcing elements of a usual tire comprising a layer of circumferential reinforcing elements distributed at a constant pitch is defined on the basis of the minimum pitch necessary to meet the various acceptance test standards for the marketing of tires. The tire according to the invention therefore experiences a reduction in the amount of material needed to produce the layer of circumferential reinforcing elements.

Likewise, the cost of the materials for manufacturing a tire according to the invention is lower than that of a tire comprising a layer of circumferential reinforcing elements distributed at a constant pitch because the amount of material needed to produce the layer of circumferential reinforcing elements is smaller. Further, for the same reasons, the time taken to manufacture the layer of circumferential reinforcing elements of the tire according to the invention is reduced compared with the time taken to manufacture a layer of circumferential reinforcing elements distributed at a constant pitch.

According to one preferred embodiment in the context of the first alternative form of the invention, whereby the value of the pitch in an axially outer part is greater than the value of the pitch in the central part, the ratio of the value of the pitch in the axially outer parts to the value of the pitch in the central part is comprised between 1.05 and 4.

Preferably also according to this embodiment, the ratio of the value of the pitch in the intermediate parts to the value of the pitch in the central part is comprised between 0.5 and 0.95.

According to a preferred embodiment in the case of the second alternative form of the invention whereby the value of the pitch in an axially outer part is less than the value of the pitch in the central part, the ratio of the value of the pitch in the axially outer parts to the value of the pitch in the central part is comprised between 0.5 and 0.95.

Preferably also according to this embodiment, the ratio of the value of the pitch in the intermediate parts to the value of the pitch in the central part is comprised between 0.4 and 0.9.

Advantageously according to an embodiment of the invention, the axial width of the central part of the layer of circumferential reinforcing elements is comprised between 10 and 50% of the axial width of the layer of circumferential reinforcing elements.

Advantageously also according to an embodiment of the invention, the axial width of each of the axially outer parts of the layer of circumferential reinforcing elements is comprised between 7 and 15% of the axial width of the layer of circumferential reinforcing elements.

Advantageously also according to an embodiment of the invention, the axial width of each of the intermediate parts of the layer of circumferential reinforcing elements is comprised between 10 and 38% of the axial width of the layer of circumferential reinforcing elements.

According to an embodiment of the invention, the distribution of the values of the pitch of the layer of circumferential reinforcing elements is symmetric with respect to the equatorial plane of the tire.

Advantageously too, the layer of circumferential reinforcing elements is centred on the crown of the tire. The distribution of the regions is thus symmetric with respect to the equatorial plane of the tire. The distribution of the circumferential reinforcing elements is therefore likewise symmetric in the axial direction with respect to the equatorial plane of the tire.

According to a first embodiment of the invention, the pitch between the circumferentially oriented reinforcing elements is constant in at least one of the parts of the layer of circumferential reinforcing elements. For preference, the pitch is constant in at least the central part.

According to a second embodiment of the invention, the pitch between the circumferentially oriented reinforcing elements can vary in at least one of the parts of the layer of circumferential reinforcing elements.

According to other embodiments of the invention, at least one of the parts of the layer of circumferential reinforcing elements combines regions of constant pitch and regions of variable pitch; for example, one part may combine a central region of constant pitch and axially outer regions of variable pitch, each having a pitch that increases towards the central region.

According to a preferred embodiment of the invention, in the case of at least one part comprising at least one region of variable pitch, the value of the pitch in the transverse direction obeys a series over at least the variable-pitch region of the at least one part of the layer of circumferential reinforcing elements.

According to a first embodiment, the value of the pitch obeys an arithmetic series of the type $U(n)=Uo+nr$, where Uo is comprised between 0.4 mm and 4 mm, and r is the common difference of the series comprised between 0.001 and 0.1.

According to a second embodiment, the value of the pitch obeys an geometric series of the type $U(n)=Uo \times rn$, where Uo is comprised between 0.4 mm and 4 mm, and r is the common difference of the series comprised between 1.001 and 1.025.

According to other embodiments of the invention, the value of the pitch may be a combination of several progressions depending on the axial position in the layer.

According to an alternative form of embodiment of the tire according to the invention, the crown reinforcement comprises at least one working crown layer of inextensible reinforcing elements making angles comprised between 10° and 45° with the circumferential direction, and, for preference, at least two working crown layers of inextensible reinforcing elements crossed from one layer to another making angles comprised between 10° and 45° with the circumferential direction.

One advantageous embodiment of the invention makes provision that the layer of circumferential reinforcing elements is positioned at least partially radially on the outside of a working layer. When the layer of circumferential reinforcing elements is produced radially on the outside of two working layers and placed directly under the tread strip, it may notably contribute to improving high-speed stability.

The layer of circumferential reinforcing elements may thus be produced directly under the tread strip in order, in addition to performing its main function, to form a layer that protects the carcass and the other layers of the crown reinforcing structure against potential mechanical attack.

The layer of circumferential reinforcing elements may also be produced between the working layers, notably for economic reasons, because this reduces the amount of material and laying time required.

Another advantageous embodiment of the invention makes provision that the layer of circumferential reinforcing elements is positioned at least partially radially on the inside of the radially innermost working layer. In this embodiment, the layer of circumferential reinforcing elements is produced radially on the inside of the working layers and may notably make it possible to improve the grip and traction of the tire still further.

Another alternative form of the invention makes provision that at least one layer of circumferential reinforcing elements is positioned at least partially radially on the inside of the carcass-type reinforcing structure.

A tire according to an aspect of the invention, notably when at least part of the crown reinforcing structure, such as a layer of circumferential reinforcing elements, is produced radially on the inside of the carcass structure, is advantageously produced using a manufacturing technique of the type involving a hard core or stiff form.

For preference also, the reinforcing elements of the layer of circumferential reinforcing elements are made of metal and/or textile and/or glass.

For preference also, the reinforcing elements of the layer of circumferential reinforcing elements have an elastic modulus in excess of 6000 N/mm$^2$.

According to another embodiment of the invention, the reinforcing elements of the layer of circumferential reinforcing elements are metal cords having a curve of tensile stress against relative elongation that exhibits shallow gradients for small elongations and a substantially constant and steep gradient for greater elongations.

In an advantageous alternative form of the invention, one layer of circumferential reinforcing elements may be produced in several parts positioned at different radial positions or different levels in the tire. Such a tire may notably comprise part of the layer of circumferential reinforcing elements radially on the outside of the other reinforcing elements in the central part of the tire, that is to say under the central part of the tread strip. This part of the layer of circumferential reinforcing elements then notably affords the carcass protection against potential attack that may occur in the central part of the tread strip, which is considered to be the most exposed. Lateral parts of the layer of circumferential reinforcing elements, independent of the central part of the layer of circumferential reinforcing elements, may be positioned at all levels, that is to say either radially on the inside of the working layers or between them or, alternatively, radially on the inside of the carcass layer, notably with a view to reducing the amount of reinforcing elements and the time taken to produce such a layer of circumferential reinforcing elements. The invention further makes provision that, in the case of a layer of circumferential reinforcing elements which is produced in several parts positioned at different radial positions, the distribution of these various parts is not symmetric with respect to the equatorial plane, or circumferential plane, passing through the centre of the crown of the tire. Such an asymmetric distribution may be further associated with a choice of different materials for the circumferential reinforcing elements.

According to this type of embodiment of a layer of circumferential reinforcing elements which is broken down into several parts, the invention advantageously plans for the axial ends of the parts to overlap one another.

According to a preferred embodiment of the invention, the reinforcing elements of the carcass-type reinforcing structure make an angle comprised between 65° and 90° with the circumferential direction.

According to an alternative form of the invention, the crown reinforcing structure comprises at least two layers of reinforcing elements, the portions making angles comprised between 20 and 160° with one another, from one layer to the next.

According to a preferred embodiment of this alternative form of the invention, at least in the central region of the tread strip, the reinforcing elements of a working layer make angles, formed with the longitudinal direction, which are identical, the angles being measured at the points of intersection with a circumferential plane, whatever the circumferential plane might be. In other words, for a given circumferential plane of section, the reinforcing elements are all at the same angle formed with the longitudinal direction at the points of intersection with the circumferential plane of section. Moreover, the aforementioned angle may vary according to the circumferential plane of section considered.

For preference also according to this alternative form of the invention, at least in the central region of the tread strip, the reinforcing elements of one working layer are equidistant from one another in all circumferential planes; the distance separating adjacent reinforcing elements being able for its part to vary according to the circumferential plane of section considered or, more specifically, it being possible for the distance between adjacent reinforcing elements to vary in the axial direction.

Another alternative form of embodiment of the invention makes provision that at least one working layer is produced at least partially radially on the inside of the carcass-type reinforcing structure.

According to a first embodiment of the invention, all of the working layers are produced radially on the inside of at least one carcass structure, i.e. on the inside of at least one carcass layer. At least one carcass-type reinforcing structure thus radially covers the entire crown reinforcing structure.

According to a second preferred embodiment of the invention, at least one layer of working reinforcing elements of the crown reinforcing structure is produced radially on the outside of the carcass-type reinforcing structure. According to this second embodiment of the invention, the layer of working reinforcing elements assumes a function of protecting the carcass and the other layers of the crown reinforcing structure against possible mechanical attack.

In an advantageous alternative form of the invention, one layer of working reinforcing elements may be produced in several parts fitted at different radial positions or different levels in the tire. Such a tire may notably comprise apart of the layer of working reinforcing elements radially on the outside of the reinforcing elements of the carcass structure in the central part of the tire, i.e. under the central part of the tread strip. This part of the layer of working reinforcing elements then notably affords the carcass protection against potential attack that may occur via the central part of the tread strip, which is considered to be the most exposed. The invention also makes provision, in the case of a layer of working reinforcing elements that is produced in several parts installed at various radial positions, that the distribution of these different parts is not symmetric with respect to the equatorial plane, or circumferential plane passing through the centre of the crown of the tire.

According to this type of embodiment of a layer of working reinforcing elements broken down into several parts, the invention advantageously makes provision for the axial ends of the parts to overlap one another.

It should be noted, as stated previously, that a tire according to the invention, notably when at least part of the crown reinforcing structure is produced, radially on the inside of the carcass structure, is advantageously produced using a manufacturing technique of the type using a hard core or stiff form.

According to an alternative form of embodiment of the invention, at least one layer of working reinforcing elements is made up of at least one continuous reinforcing thread which, in the central region of the layer, forms portions making identical angles with the longitudinal direction, the angles being measured at the points of intersection with a circumferential plane, two adjacent portions being connected by a loop, and the portions making an angle comprised between 10 and 80° with the longitudinal direction.

The term "thread" denotes, very generally, both monofilaments, multifilament fibres (possibly twisted on themselves) or assemblies such as textile or metal cords, folded yarns or alternatively any type of equivalent assembly, for example a hybrid cord, irrespective of the material or materials or potential treatment of these threads, for example a surface treatment or coating, or precoating to encourage adhesion to the rubber or any other material.

According to this advantageous alternative form of the invention, the working layer is produced with at least one thread no free end of which is present on the edges of the layer. For preference, the layer is produced using a single thread and the layer is of the "single thread" type. However, industrial production of such layers leads to discontinuities notably as a result of changes of reel. A preferred embodiment of the invention further consists in using just one or a small number of threads for a working layer and the starts and ends of threads need to be positioned in the central region of the layer.

A tire according to an embodiment of the invention thus produced comprises a reinforcing structure that has no free end of the reinforcing elements at the axially outer edges of the working layers.

The studies conducted notably revealed that the presence of traditional layers of reinforcing elements set at an angle to the longitudinal direction leads to local, circumferential and shear, stiffnesses which decrease as the edges of the layers are neared, the tension at the ends of the reinforcing elements being zero. Zero local tension in the reinforcing elements results in lower effectiveness of the reinforcing elements in this region. Now, the stiffnesses of the edges of the layers are particularly high when the tire is used at steeper camber angles, under cornering, the part of the tire corresponding to these regions then facing the ground.

The creation of motorcycle tires leads to high values of curvature when the tires are used at camber angles. A tire produced according to this alternative form of the invention and which comprises a reinforcing structure that has no free end of the reinforcing elements in the region of the axially outer edges of the working layers thus notably allows the grip and traction of the tires to be enhanced for use at steep camber angles.

Such a tire is advantageously produced using a technique of the type using a hard form or a toroidal form, which notably allows the reinforcing elements to be laid in the near-final position; specifically, a shaping step is not required with this type of method, which means that the reinforcing elements are no longer shifted once they have been laid.

In one advantageous embodiment of the invention, notably with a view to further optimizing the stiffnesses of the reinforcing structure along the meridian plane of the tire, particularly at the edges of the working layers, the angles formed by the portions of the thread in the working layers with the longitudinal direction can vary in the transverse direction such that the angles are greater on the axially outer edges of the layers of reinforcing elements by comparison with the angles of the portions measured at the equatorial plane of the tire.

The use of a technique of the type using a hard form which notably allows the reinforcing elements to be laid in the near-final position without the need for a shaping step has further advantages. Specifically, a technique of the hard form type in particular allows markedly greater variations in angles than can be obtained using methods that involve a shaping step to be achieved in a simple way. Further, the variations in angle, the angle tending towards 90° at the edges of the working layers, leads to an increase in the pitch and encourages the creation of loops, because of the reduction in bulk.

A first embodiment of the alternative forms of embodiment of the invention whereby the angles formed by the portions of the thread in the working layers with respect to the longitudinal direction can vary in the transverse direction, consists in varying the angle of the portions monotonously from the equatorial plane of the tire as far as the edges of the working layer.

A second embodiment of these alternative forms consists in having the angle change in steps from the equatorial plane of the tire as far as the edges of the working layer.

A final embodiment of these alternative forms consists in allowing the angle to evolve in such a way that given values are obtained for given axial positions.

These various embodiments of the alternative forms of embodiment of the invention whereby the angles formed by the portions of the thread of the working layers with respect to the longitudinal direction can vary in the transverse direction in other words make it possible to obtain good circumferential stiffness of the crown reinforcing structure through the presence of tight, that is to say small, angles in the region of the crown of the tire, that is to say in the region flanking the equatorial plane. Further, on the other hand, the presence of open angles, that is to say angles tending towards 45°, or, even beyond, tending towards 90°, can be obtained on the edges of the working layer or, more exactly, at the shoulders of the tire in order to improve the grip, traction, comfort or else the operating temperature of the tire; specifically, such variations in angle make it possible to modulate the shear stiffnesses of the working layers.

According to one preferred embodiment of the invention, the reinforcing elements of the working layers are made of a textile material.

According to another embodiment of the invention, the reinforcing elements in the working layers are made of metal.

BRIEF DESCRIPTION OF THE DRAWINGS

Further details and advantageous features of the invention will emerge hereinafter from the description of the exemplary embodiments of the invention, given with reference to FIGS. 1 to 3 which depict:

For ease of understanding, FIGS. 1 to 3 are not drawn to scale.

DETAILED DESCRIPTION OF THE PRESENTLY PREFERRED EMBODIMENTS

Figure 1:
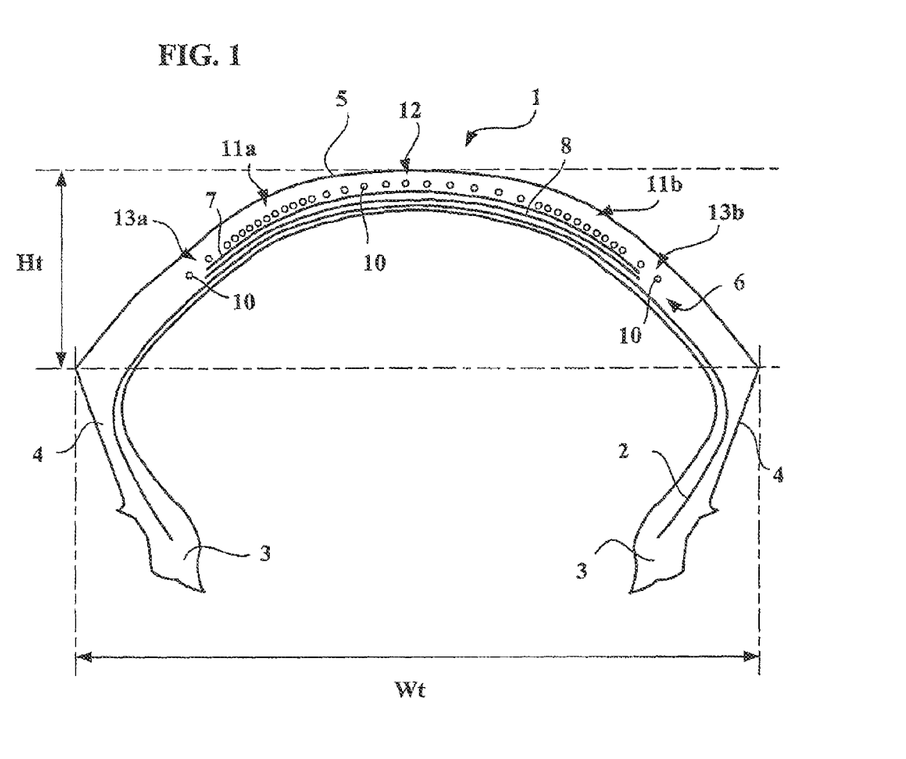
FIG. 1 is a meridian view of a tire layout according to a first embodiment of the invention.

FIG. 1 depicts a tire 1 of 190/50 ZR 17 type intended to be fitted to the rear of a motorcycle. This tire 1 comprises a carcass reinforcement consisting of a layer 2 comprising reinforcing elements of the textile type. The layer 2 consists of reinforcing elements arranged radially. The radial positioning of the reinforcing elements is defined by the angle at which the reinforcing elements are laid; a radial arrangement corresponds to the elements being laid at an angle comprised between 65° and 90° with respect to the longitudinal direction.

The layer 2 is anchored on each side of the tire 1 in a bead 3 the base of which is intended to be mounted on a rim seat. Each bead 3 is extended radially outwards by a sidewall 4, the sidewall 4 radially towards the outside meeting the tread strip 5. The tire 1 thus constructed has a curvature value in excess of 0.15 and preferably in excess of 0.3. The curvature value is defined by the Ht/Wt ratio, namely the ratio of the height of the tread strip to the maximum width of the tread strip of the tire. The curvature value will advantageously be between 0.25 and 0.5 for a tire intended to be fitted at the front of a motorcycle and will be advantageously comprised between 0.2 and 0.5 for a tire intended to be fitted at the rear.

The tire 1 further comprises a crown reinforcement 6 consisting of two layers 7 and 8 of reinforcing elements making angles with the circumferential direction, the reinforcing elements being crossed from one layer to the next and making angles of 50° between them in the region of the equatorial plane, the reinforcing elements of each of the layers 7 and 8 making an angle of 25° to the circumferential direction.

The reinforcing elements of the two layers 7 and 8 are made of a textile material and, more specifically, of aramid.

The crown reinforcement 6 according to the invention comprises a layer of circumferential reinforcing elements 10 radially on the outside of the layers 7, 8. The layer of circumferential reinforcing elements 10 is thus the radially outermost part of the crown reinforcement 6 and the two working layers 7, 8 are interposed between the carcass layer 2 and the layer of circumferential reinforcing elements 10. The layer of circumferential reinforcing elements 10 advantageously consists of a single thread which has been wound to make an angle substantially equal to 0° with the longitudinal direction. The layer of circumferential reinforcing elements 10 may alternatively be produced by the simultaneous winding of several bare or rubberized threads or threads in the form of strips when they are embedded in rubber.

The circumferential reinforcing elements 10 are wound in such a way that the pitch between two circumferential reinforcing elements varies in the axial direction.

This variation in the laying pitch leads to a variation in the density of the circumferential reinforcing elements that is such that the density is greater in the intermediate parts 11a and 11b. The circumferential reinforcing element densities will therefore decrease, firstly from these intermediate parts 11a and 11b with a density of 100 threads/dm (pitch of 1 mm) towards the central part 12 of the layer of circumferential reinforcing elements 10, the central part 12 being axially contiguous with the intermediate parts 11a and 11b, with a density of 75 threads/dm (pitch of 1.33 mm), and secondly, from these intermediate parts 11a and 11b towards the lateral parts 13a and 13b of the layer of circumferential reinforcing elements 10 the lateral parts 13a and 13b being axially contiguous with the respective intermediate parts 11a and 11b, with a density of 70 threads/dm (pitch of 1.43 mm).

The ratio of the value of the pitch in the axially outer parts 13a, 13b to the value of the pitch in the central part 12 is equal to 1.07 and therefore falls between 1.05 and 4.

The ratio of the value of the pitch in the intermediate parts 11a, 11b to the value of the pitch in the central part 12 is equal to 0.75, and therefore falls between 0.5 and 0.95.

The width of the layer of circumferential reinforcing elements 10 is equal to 170 mm.

The parts 11a and 11b each have an axial width of 62 mm. The axial width of each of the intermediate parts 11a and 11b of the layer of circumferential reinforcing elements is equal to 36% of the axial width of the layer of circumferential reinforcing elements, which falls between 10 and 38% of the width.

The central part 12 has an axial width of 20 mm. The axial width of the central part of the layer of circumferential reinforcing elements is equal to 12% of the axial width of the layer of circumferential reinforcing elements and therefore falls between 10 and 50% of the width.

The parts 13a and 13b each have an axial width of 13 mm. The axial, width of each of the axially outer parts 13a and 13b of the layer of circumferential reinforcing elements is equal to 8% of the axial width of the layer of circumferential reinforcing elements and therefore falls between 7 and 15% of the width.

According to the invention, in the case of a tire intended to be fitted at the rear of a motorcycle, the value of the pitch in an axially outer part is greater than the value of the pitch in the central part. The stiffness in the circumferential direction of the axially outer part of the layer of circumferential reinforcing elements is therefore lower than the stiffness of the central part in the circumferential direction.

The presence of the layer of circumferential reinforcing elements in the tire contributes firstly to improving performance in terms of endurance and secondly the distribution at a variable pitch allows the circumferential stiffnesses of the crown reinforcement of the tire to be modulated in order to optimize the compromises between flattening, wear and high-speed performance of the tire.

The layer of circumferential reinforcing elements 10 consists of textile reinforcements of the metal 6*23 type.

Figure 2:
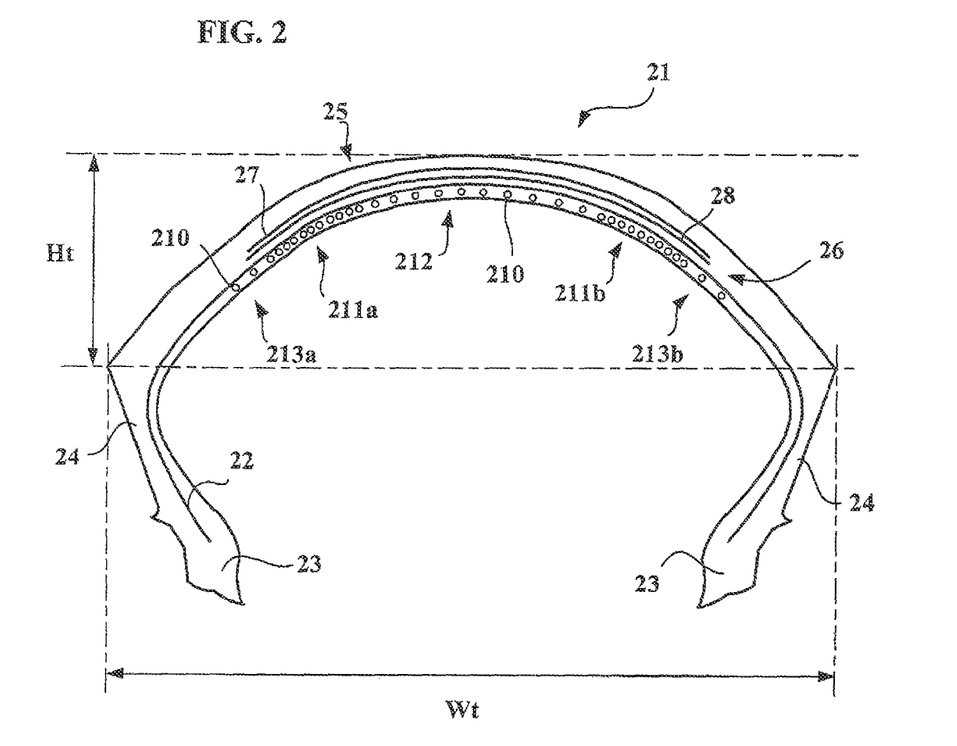
FIG. 2 is a meridian view of a tire layout according to a second embodiment of the invention.

FIG. 2 depicts a tire 21 similar to that of FIG. 1 and which differs therefrom in the radial position of the layer of circumferential reinforcing elements 201. In this second depiction according to the invention, the layer of circumferential reinforcing elements 210 has been positioned radially on the inside of the carcass reinforcement 2 and therefore radially on the inside of the two working layers 27, 28. This radial position of the layer of circumferential reinforcing elements 210 allows in particular a further improvement in the grip and traction properties of the tire.

Figure 3:
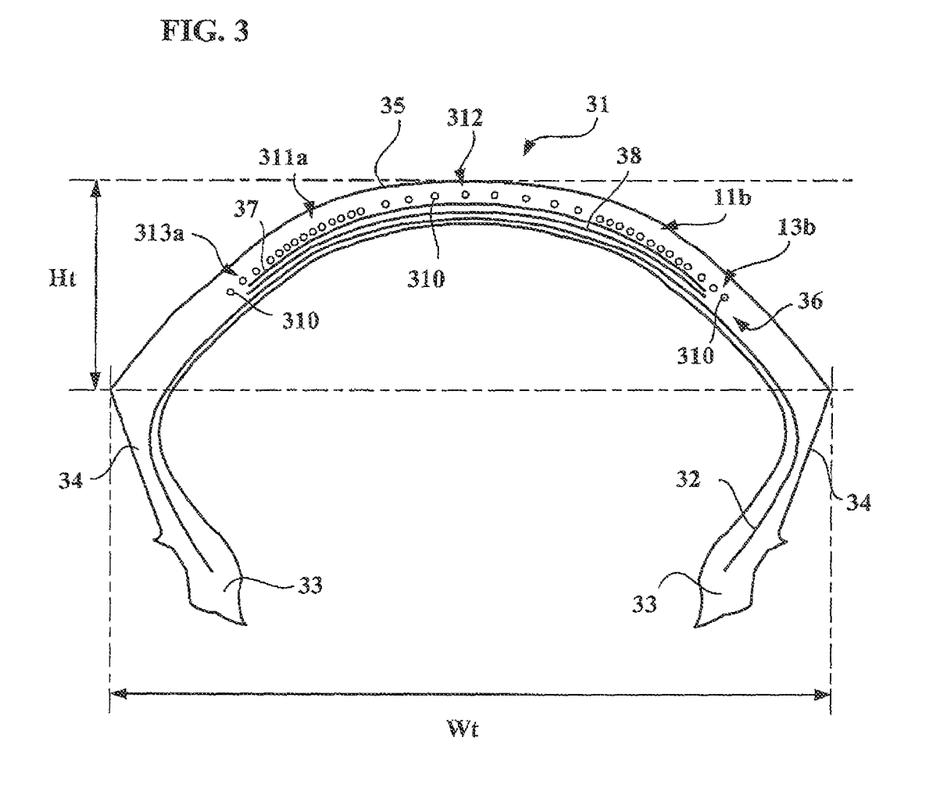
FIG. 3 is a meridian view of a tire layout according to a third embodiment of the invention.

FIG. 3 depicts a tire 31 of 120/70 ZR 17 type intended to be fitted at the front of a motorcycle.

The crown reinforcement 36 of the tire 31 is similar to that of the tire 1 illustrated in FIG. 1. The only difference is in the layer of circumferential reinforcing elements 310 and, more specifically, the variation in the pitch at which the reinforcing elements are laid.

As in the case of FIG. 1 and according to the invention, the variation in laying pitch leads to a variation in the density of circumferential reinforcing elements which is such that the density is greater in the intermediate parts 311a and 311b. The circumferential reinforcing element densities therefore decrease, firstly, from these intermediate parts 311a and 311b at which the density is 90 threads/dm (pitch of 1.11 mm) towards the central part 312 of the tire at which the density is 60 threads/dm (pitch of 1.67 mm), and, secondly, from these intermediate parts 311a and 311b towards the lateral parts 313a, 313b of the layer of circumferential reinforcing elements 310 where the density is 70 threads/dm (pitch of 1.43 mm).

Unlike the situation in FIG. 1, and according to the invention for a tire intended to be fitted at the front of a motorcycle, the value of the pitch in an axially outer part 313a, 313b is lower than the value of the pitch in the central part. The stiffness, in the circumferential direction, of the axially outer part of the layer of circumferential reinforcing elements is therefore greater than the stiffness, in the circumferential direction, of the central part.

The ratio of the value of the pitch in the axially outer parts 313a, 313b to the value of the pitch in the central part 312 is equal to 0.86 and therefore falls between 0.5 and 0.95.

The ratio of the value of the pitch in the intermediate parts 11a, 11b to the value of the pitch in the central part 12 is equal to 0.67 and therefore falls between 0.4 and 0.7.

The width of the layer of circumferential reinforcing elements 10 is 106 mm.

The parts 311a and 311b each have an axial width equal to 20 mm. The axial width of each of the intermediate parts 311a and 311b of the layer of circumferential reinforcing elements is equal to 19% of the axial width of the layer of circumferential reinforcing elements which falls between 10 and 38% of the width.

The central part 312 has an axial width of 40 mm. The axial width of the central part 312 of the layer of circumferential reinforcing elements is equal to 38% of the axial width of the layer of circumferential reinforcing elements and therefore falls between 10 and 50% of the width.

The parts 313a and 313b each have an axial width of 13 mm. The axial width of each of the axially outer parts 313a and 313b of the layer of circumferential reinforcing elements is equal to 12% of the axial width of the layer of circumferential reinforcing elements and therefore falls between 7 and 15% of the width.

The layer of circumferential reinforcing elements 10 consists of textile reinforcements of the metal 4*23 type.

The invention should not be interpreted as being restricted to the description of the examples above. The invention notably encompasses tires that may have more complex crown reinforcements, for example comprising 3 or more working layers of reinforcing elements making an angle with the circumferential direction.

The invention also applies to the various types of crown reinforcement listed hereinabove and notably those described in patent applications WO 2004/018236, WO 2004/018237, WO 2005/070704, WO 2005/070706, notably exhibiting the various radial positions of the layers that make up the crown reinforcement relative to one another, and their radial position with respect to the carcass structure, plus also the makeup of a layer formed of a thread constituting portions connected by loops or even varied angles formed by the portions with the axial direction.

What is claimed is:

1. A tire with a radial carcass reinforcement comprising:
a crown reinforcement comprising at least one layer of circumferential reinforcing elements distributed axially at a variable pitch,
wherein said at least one layer of circumferential reinforcing elements is radially crowned by a tread strip,
wherein said tread strip is connected to two beads by two sidewalls,
wherein said at least one layer of circumferential reinforcing elements comprises five axially contiguous parts, including a central part, two intermediate parts and two axially outer parts, wherein an axial width of each of said two axially outer parts of said at least one layer of circumferential reinforcing elements is between 7% and 15% of an axial width of said at least one layer of circumferential reinforcing elements,
wherein each pitch value in each of said two intermediate parts is less than each pitch value in each of said two axially outer parts,
wherein each of said two axially outer parts is axially separated from said central part by a corresponding one of said two intermediate parts,
wherein each pitch value in said each intermediate part is less than each pitch value in said central part, and
wherein each pitch value in each of said two axially outer parts is less than each pitch value in said central part said central part being between 0.5 and 0.95.

2. The tire according to claim 1, wherein a ratio of each value of the pitch in said two intermediate parts to each value of the pitch in said central part is between 0.4 and 0.7.

3. The tire according to claim 1, wherein an axial width of said central part of said at least one layer of circumferential reinforcing elements is between 10 and 50% of an axial width of said at least one layer of circumferential reinforcing elements.

4. The tire according to claim 1, wherein an axial width of each of said two intermediate parts of said at least one layer of circumferential reinforcing elements is between 10 and 38% of an axial width of said at least one layer of circumferential reinforcing elements.

5. The tire according to claim 1, wherein a distribution of values of said variable pitch of said at least one layer of circumferential reinforcing elements is symmetric with respect to an equatorial plane of the tire.

6. The tire according to claim 1, wherein said crown reinforcement comprises at least two working crown layers of inextensible reinforcing elements, and wherein the inextensible reinforcing elements of each of said at least two working crown layers are crossed with the inextensible reinforcing elements of its neighbouring working crown layers at an angle between 10° and 45° with the circumferential direction.

7. The tire according to claim 1, wherein said crown reinforcement further comprises at least two layers of reinforcing elements, and wherein the reinforcing elements of each of said at least two layers are crossed with the reinforcing elements of its neighbouring layers at an angle between 20 and 160° with one another.

* * * * *